United States Patent [19]

Stang

[11] Patent Number: 5,062,558
[45] Date of Patent: Nov. 5, 1991

[54] FOOD TRAY AND BIB SYSTEM

[76] Inventor: Michael A. Stang, 26 Stockmill Rd., Apt. F, Pikesville, Md. 21208

[21] Appl. No.: 519,475

[22] Filed: May 7, 1990

Related U.S. Application Data

[63] Continuation-in-part of Ser. No. 246,678, Sep. 20, 1988, Pat. No. 4,946,094.

[51] Int. Cl.$^5$ .............................................. A45F 5/00
[52] U.S. Cl. ..................................... 224/270; 224/202; 224/205; 2/49 A; 383/119
[58] Field of Search ............... 224/906, 270, 202, 273, 224/205, 148; 2/49 A, 49 R; 108/43, 44; 248/444; 229/904; 220/575; 206/549, 542, 564, 562; 383/119

[56] References Cited

U.S. PATENT DOCUMENTS

| 298,985 | 5/1884 | Kimball | 224/148 |
|---|---|---|---|
| 1,591,721 | 7/1926 | Melvin | 2/49 R |
| 2,265,690 | 12/1941 | Fiedler | 2/49 R |
| 2,672,614 | 3/1954 | Zimmerman et al. | 2/49 R |
| 2,704,625 | 3/1955 | Huse | 224/906 |
| 2,738,511 | 3/1956 | Brady | 2/49 R |
| 3,907,195 | 9/1975 | Struble | 229/904 |
| 4,335,812 | 6/1982 | Koves | 224/205 |
| 4,350,274 | 9/1982 | Morgan | 224/205 |
| 4,754,903 | 7/1988 | Dennis | 224/205 |
| 4,860,381 | 8/1989 | Bartley | 224/270 |
| 4,915,278 | 4/1990 | Smith | 224/906 |

FOREIGN PATENT DOCUMENTS

| 1010602 | 5/1977 | Canada | 2/49 A |
|---|---|---|---|
| 2178298 | 2/1987 | United Kingdom | 23/49 R |

Primary Examiner—Linda J. Sholl
Attorney, Agent, or Firm—Morton J. Rosenberg; David I. Klein

[57] ABSTRACT

This invention pertains to a food tray and bib system (10) which is adapted to be removably coupled to the neck (16) of a user's body (18). The food tray and bib system (10) includes a flexibly collapsible housing and bib assembly (20) having a deformable cavity (30) for receipt of a tray assembly (40). Housing and bib assembly (20) includes a rear wall (22) having a lower portion (21) defining a rear wall of the deformable cavity (30), and an upper portion (23) extending longitudinally from deformable cavity (30) a predetermined distance to define a bib-like structure. Upper portion (23) of rear wall (22) includes an arcuate cut-out portion (33) whose perimeter is defined by a pair of strap members (34) of alternately a through opening (32) may be provided for releasable coupling to the neck (16) of the user's body (18). The forward portion of deformable cavity (30) is structurally supported by an angular portion (28) integrally formed in each side wall (26) extending from an upper portion of rear wall (22) to a forward perimeter portion of deformable cavity (30). Tray assembly (40) is formed in a parallelepiped contour and includes a plurality of corner posts (46) for establishing the contour of deformable cavity (30), subsequent to insertion of tray assembly (40) therein.

16 Claims, 2 Drawing Sheets

FOOD TRAY AND BIB SYSTEM

REFERENCE TO RELATED APPLICATIONS

This invention is a Continuation-in-Part of U.S. Pat. application Ser. No. 07/246,678, having a filing date of Sept. 20, 1988, now U.S. Pat. No. 4,946,094 entitled "CONTAINER SYSTEM".

BACKGROUND OF THE INVENTION

1. Field of the Invention

This invention directs itself to tray and container systems adapted to be removably coupled to the body of a user. In particular, this invention relates to a food tray and bib system having a flexibly collapsible housing defining a deformable cavity for receipt of a tray for supporting food items. Still further, this invention directs itself to a food tray and bib system wherein one wall of the flexibly collapsible housing extends from the deformable cavity to form a bib-like structure adapted for contiguously interfacing with the neck of a user. More in particular, this invention relates to a food tray and bib system having a flexible collapsible housing wherein angular side wall portions provide structural support for the forward portion of the deformable cavity. Still further, this invention directs itself to a food tray and bib system wherein the tray structure utilizes side walls of minimum height by providing a plurality of corner post structures which define the contour of the deformable cavity subsequent to insertion therein.

2. Prior Art

Food tray and bib systems for containing objects and which are releasably attachable to the user's body are known in the art. The best prior art known to Applicant include U.S. Pat. Nos. 2,265,690; 2,704,625; 2,833,458; 3,640,380; 3,090,330; 1,569,157; 4,754,903; 2,844,141; 4,489,879; 2,426,484; 2,637,518; 3,283,971; 2,597,473; 2,028,825; 798,754; 2,289,945; 1,183,747; 2,523,217; 2,441,115; 4,483,469; 2,277,241; and, 2,312,608.

In some prior art systems, such as that shown in U.S. Pat. No. 2,265,690, there is provided an apron having a bottom portion defining a housing for catching waste or other matter during the preparation of various foods. The rear wall forms a bib-like structure which extends from the cavity of the tray-like body. However, the collapsible tray-like body is formed of stiff material and adapted for angular displacement of the tray-like body relative to the rear wall and thus cannot provide stable support for food and beverage items, as provided by the instant invention. Further, the structure lacks angularly directed side wall portions which would provide structural support for the tray-like body and provide additional means for capturing spills and debris.

In other prior art systems, such as that disclosed in U.S. Pat. No. 2,704,625 containers for picking berries are provided. The containers include a receptacle portion coupled to a supporting bib-like structure. However, such structures are not formed with a flexibly collapsible housing, but are formed of relatively stiff materials which foldably define a box-like structure. Such structures do not provide the compact and convenient means for storage and disposal nor side wall portions to aid in collecting spills and debris.

Other prior art systems such as U.S. Pat. No. 2,833,458 direct themselves to folding trays particularly adapted to holding food items and beverage containers. While such folding trays may have corner portions which extend above the cavity defined by the side wall members, such corners do not provide means for minimizing the height of the wall members, nor do they provide a means for defining the contour of a receptacle into which the tray would be placed.

Other prior systems do not provide for a flexible collapsible housing having a plastic bag-like structure defining a deformable cavity for receipt of a relatively rigid tray-like structure.

SUMMARY OF THE INVENTION

A food tray and bib system is provided and adapted to be removably coupled to the body of a user. The food tray and bib system includes a tray assembly for supporting food items disposed thereon. The food tray and bib system also includes a flexibly collapsible housing integrally formed in one-piece formation and defining a deformable cavity for receipt of the tray assembly. Further, the food tray and bib system includes a bib structure for overlaying a first portion of a user's body and providing a removable coupling to a second portion thereof. The bib structure defines a rear wall of the housing extending longitudinally a predetermined distance from the deformable cavity.

An object of the subject food tray and bib system is to provide a system which includes a flexible collapsible housing for receipt of a relatively rigid tray assembly.

It is a further object of the subject invention to provide an inexpensive, easily manufacturable food support system which may be disposed after use.

It is still another object of the subject invention to provide a food tray and bib system which may be mounted around the neck of the user to facilitate support of the objects disposed on the tray assembly contained within the deformable cavity of the flexibly collapsible housing.

It is another object of the subject invention to provide a food tray and bib system which performs a bib-like function for the user and may be disposed of after use.

It is an object of the invention to provide a bib structure having side wall portions which aid in directing spills and debris into the internal chamber of the tray assembly, as well as provide structural support for the forward portion of the flexibly collapsible housing.

It is a further object of the subject invention to provide a system of sufficiently low cost and sufficiently collapsible to be considered conveniently disposable after a single use.

DESCRIPTION OF THE PREFERRED EMBODIMENTS

Figure 1:
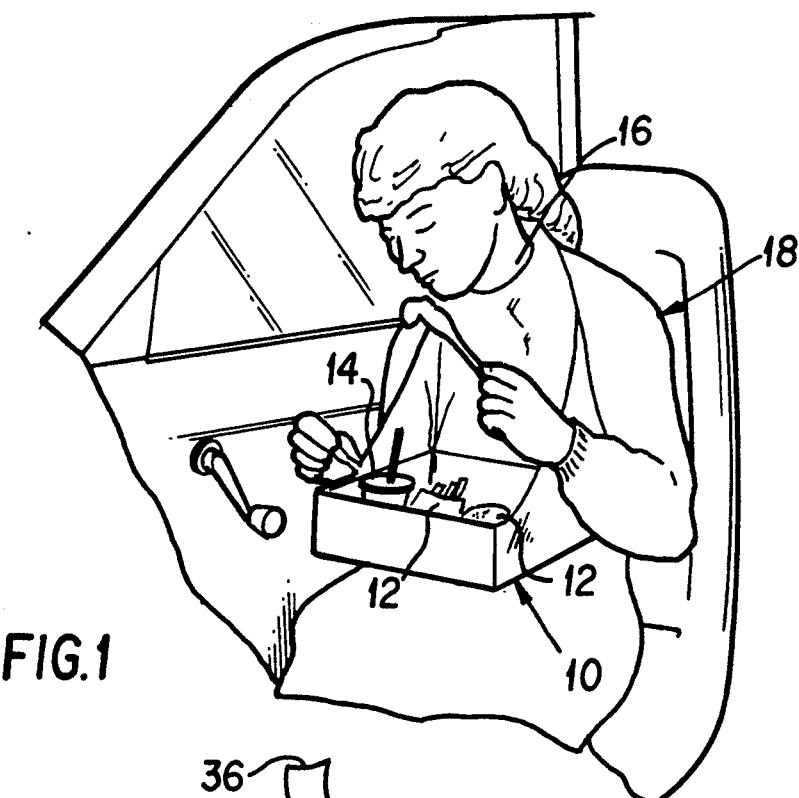
FIG. 1 is a perspective view of the subject food tray and bib system mounted on the body of a user.

Referring to FIGS. 1–4, there is shown food tray and bib system 10 adapted to be removably coupled to the neck 16 of a user 18. Food tray and bib system 10 provides a convenient means for containing and supporting food items 12 and beverage containers 14 while they are being consumed by the user 18. Although generally directed to providing support to fast-food type items, it is to be clearly understood that such representations, as shown in FIG. 1, are only representative in nature, and that the food tray and bib system 10 may be adapted to contain a wide variety of containers and items at the discretion of the user. Additionally, tray and bib system 10 may in its component parts be formed of plastic materials, and/or cardboard material compositions to allow the food tray and bib system 10 to be disposable subsequent to use.

Food tray and bib system 10 may be used in situations where the user has purchased various food products and wishes to eat them in an area where normal sit-down table conditions do not exist. Thus, food tray and bib system 10 is adapted to be removably coupled to the neck portion 16 of a user's body 18, as is clearly seen in FIG. 1. Therefore, food tray and bib system 10 provides for the dual objectives for providing a personal tray having a stable containment volume for a plurality of food containers 12 and 14, as well as providing a bib-like structure for overlaying a portion of the user's body and thereby protect the user's clothing from spills.

Subsequent to use, food tray and bib system 10 is uncoupled from the body 18 of the user and may then be disposed of along with the food containers 12 and 14 contained therein. Alternately, the tray and bib system may be saved for subsequent use. Additionally, although not restricted for the use of juveniles, food tray and bib system 10 is of great advantage for use by children in the confined areas of a vehicle, as depicted in FIG. 1. In the manner to be described in following paragraphs, food tray and bib system 10 is mounted to the user's neck 16 and during the process may be used to catch crumbs, liquid and other debris, thus minimizing cleaning up of the vehicle interior subsequent to eating.

Figure 2:
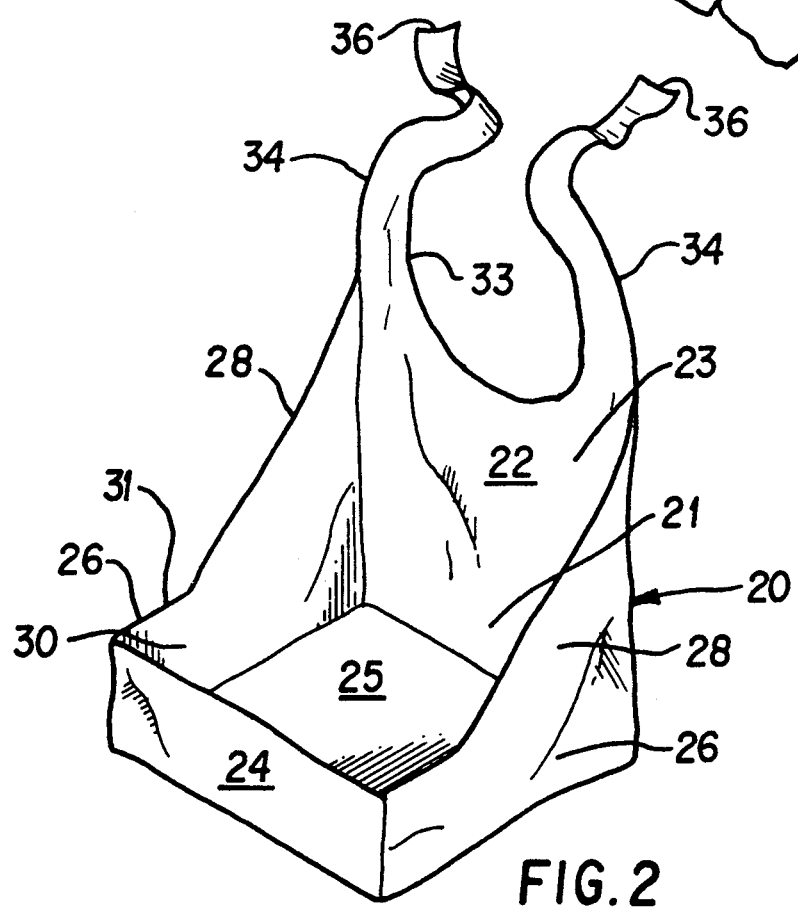
FIG. 2 is a perspective view of the housing and bib assembly of the food tray and bib system.
Figure 3:
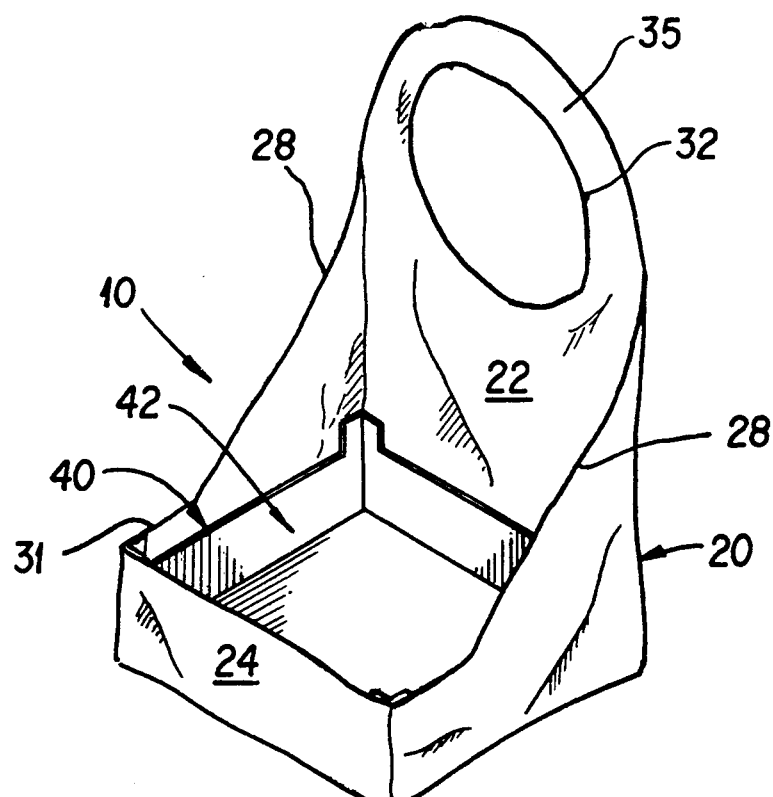
FIG. 3 is a perspective view of the food tray and bib system.

The food tray and bib system 10 includes a housing and bib assembly 20, a portion of which defines a deformable cavity 30 having an upper opening 31 formed in the top thereof, as shown in FIGS. 2 and 3. A tray assembly 40 is received within the deformable cavity 30 through upper opening 31 for providing a stable temporary support for the food items 12 and the beverage container 14, which are reversibly insertable from within the internal chamber 42 defined by the tray 40 through the upper opening 31, as is clearly shown.

Housing and bib assembly 20 is a flexibly collapsible structure formed from a flexible plastic material. The thin plastic material is formed into the housing and bib assembly by techniques well known in the plastic shopping bag manufacturing art, wherein all of the side walls are joined to form the bottom wall 25. The plastic bag-like structure includes respective opposing rear and front wall members 22 and 24 and a pair of opposing side walls 26 which are all joined by techniques well known in the art to form the bottom wall 25. The respective wall members 22-26 define a deformable cavity 30 into which is received the tray assembly 40.

The flexible and collapsible nature of housing and bib assembly 20 provides convenient means for storage and subsequent disposal, whereby it is possible to compact housing and bib assembly 20 in a conveniently efficient manner.

The rear wall 22 of housing and bib assembly 20 extends longitudinally a predetermined distance from the deformable cavity 30 and is adapted to be releasably coupled to the body of the user. The distance being selected so as to locate tray assembly 40 at a convenient position on the torso of the user's body. The extension of rear wall 22 provides a bib-like structure which overlays a portion of the user's body for protecting the user's clothing from being soiled by crumbs or spills which may occur during the consumption of the food items.

In particular, as shown in FIG. 3, rear wall 22 includes a through opening 32 of sufficient size to permit the user's head to pass through wherein the end portion 35 of wall 32 rests behind the neck 16 of the user's body 18.

Alternately, as shown in FIG. 2, rear wall 22 may be formed with a cut-out portion 33 having an arcuate contour for interfacing with neck 16 of the user's body 18. The perimeter portion of the cutout 33 is defined by a pair of strap members 34 integrally formed in the rear wall 22 for providing a releasable coupling around the neck 16 of the user's body 18. The distal ends 36 of strap members 34 may be simply tied together or coupled by other well known means, such as with snaps, buckles, or hook-and-loop type fasteners.

Due to the flaccid nature of housing and bib assembly 20, means must be provided for adequate stable support of the tray assembly 40 and the food items to be contained therein. To this end, each of side walls 26 are provided with an integrally formed angularly extended portion 28. Angular portions 28 extend between a forward perimeter portion of the deformable cavity 30 to an upper portion of the bib-like structure of rear wall 22, thereby providing means to support the forward end of the housing structure. Obviously, the angularly extended portions 28 could extend from the most forward portion of side wall 26, where side walls 26 join front wall 24, however, easier access to the food items contained within the cavity is obtained when the angularly extended portions 28 extend from a location a predetermined distance rearward from the front wall 24.

Further, the respective angularly extended portions 28 of side walls 26 provide additional protection from spills and debris. The extended side wall portions act to funnel spills and crumbs into the internal chamber 42 of tray assembly 40. Thus the angularly extended side wall portions 28 provide an additional means for protecting the user's clothing and maintaining the surrounding area in a clean condition.

Figure 4:
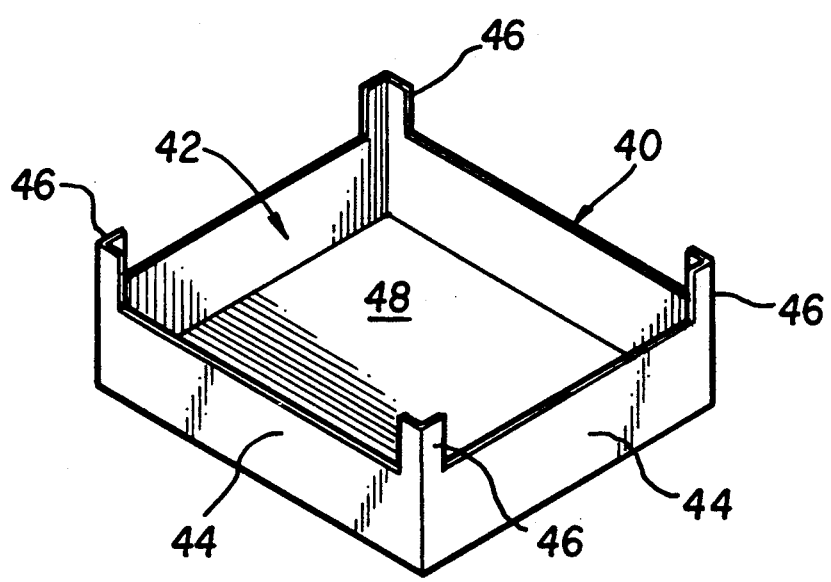
FIG. 4 is a perspective view of the tray assembly for the food tray and bib system.

Tray assembly 40, as shown in FIG. 4, has a substantially parallelepiped contour, although such contour is not important to the inventive concept as herein described, with the exception that such be the size and dimension which adequately accepts food items 12 and beverage container 14. Tray assembly 40 may be formed from a cardboard material composition or a relatively rigid plastic material. Tray assembly 40 is formed by two pairs of opposing wall members 44 each coupled to a respective side of a planar bottom member 48, the structure defining an internal chamber 42 for receipt of the food items 12 and beverage container 14.

The shape of deformable cavity 30 of housing and bib assembly 20 is defined by tray assembly 40 subsequent to tray 40 being inserted therein. The deformable cavity 30 is displaced into the contour defined by tray assembly 40 with the aid of a plurality of corner posts 46 which extend from the perimeter of the internal chamber 42 and are integrally formed with the side walls 44. One corner post 46 being located at, and extending from each interface between adjacent wall members 44.

The use of corner posts 46 for defining the contour of deformable cavity 30 allows the height of side walls 44 to be minimized, thereby maintaining the weight of tray assembly 40 at a substantially minimum value. Thus, side walls 44 need only be made a height sufficient to provide rigidity to the tray structure, utilizing a minimum of material in the form of corner posts 46 for holding open and defining the shape of the deformable cavity 30.

The minimization of the weight of tray assembly 40 is particularly important to the inventive concept. Since the housing and bib assembly 20 is intended to be fabricated from a thin plastic material, it will have a limited load supporting capacity. As that load is made up of both the food items 12 and 14 and tray assembly 40, it is desirable to maximize the food item carrying capacity by minimizing the load contribution of tray assembly 40. Obviously the material thickness of housing and bib assembly 20 could be increased to compensate for any increased load due to a tray whose weight is not minimized, or particular laminated plastic compositions may be utilized. However, such would greatly increase the material cost for system 10, and potentially add sufficient weight to housing and bib assembly 20 to make it uncomfortable to wear about the user's neck.

Thus, a lightweight and inexpensive means for releasably coupling the tray assembly 40 to the user's body 18 is provided in a one-piece formation. The housing and bib assembly 20 provides a bag-like container which defines a flexibly collapsible housing having a deformable cavity 30 open on one end for receipt of the tray assembly 40. The rear wall member 22 includes a lower portion 21 which defines a rear wall of the cavity 30, and an upper portion 23 which extends longitudinally a predetermined distance from the deformable cavity 30 for defining a bib-like structure.

Of particular importance, is the configuration of the opposing side walls 26, each having an angularly extended portion 28 extending angularly between a respective forward perimeter portion of the deformable cavity to the upper portion 23 of rear wall 22. The angular side wall portions 28 are each integrally formed to a respective lower portion of side wall 26 and a respective side of rear wall 22 in one-piece formation. The angular side wall portions 28 provide both a structural support for the forward end of deformable cavity 30 for support of the tray assembly 40 and the food items contained therein, and a means to funnel spills and debris into the internal chamber 42 of tray assembly 40.

Rear wall 22 is provided with an arcuate cutout portion 33, or alternately, a through opening 32 for contiguously interfacing with the neck portion 16 of the user's body 18. Where a cutout 33 is provided in rear wall 22, such is arcuate in contour and has a perimeter defined by a pair of strap members 34 whose distal ends 36 may be tied or otherwise releasably coupled one to the other to releasably secure system 10 to the user. Alternately, a through opening 32 may be provided in rear wall 22 for providing a releasable coupling to the user's body 18 by passing the user's head therethrough.

Although this invention has been described in connection with specific forms and embodiments thereof, it will be appreciated that various modifications other than those discussed above may be resorted to without departing from the spirit or scope of the inventions. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A food tray bib system adapted to be removably coupled to the body of a user, comprising:
   a flexibly collapsible housing integrally formed in one piece formation and defining a deformable cavity;
   bib means for overlaying a first portion of a user's body and providing a removable coupling to a second portion of said user's body, said bib means defining a rear wall of said housing extending longitudinally a predetermined distance external said cavity, said flexibly collapsible housing including an opposing pair of side walls, each of said side walls having an angularly extended portion extending between a forward perimeter portion of said cavity and an upper portion of said bib means; and,
   tray means insertable within said deformable cavity for supporting food items disposed thereon, said tray means including a container housing having a predetermined contour and defining an internal housing chamber having a planar bottom member for supporting said food items, said container housing within said deformable cavity, whereby subsequent to receipt of said container housing said deformable cavity substantially conforms to said contour of said container housing, said container housing including a plurality of corner members, each of said corner members extending a predetermined distance external said internal housing chamber for interfacing with said pair of opposing side walls to provide a vertically extending support for said opposing side walls in said vertical direction and maintaining said opposing side walls in a substantially vertical plane.

2. The tray and bib system as recited in claim 1 where said container housing has a substantially parallelepiped contour having an opening formed therein on a side opposing said planar bottom member for receiving and removing said food items from said bottom member.

3. The tray and bib system as recited in claim 2 where said container housing is formed from a cardboard material composition.

4. The tray and bib system as recited in claim 2 where said container housing is formed of a plastic material composition in one piece formation.

5. The tray and bib system as recited in claim 6 where said rear wall defined by said bib means has a through opening formed therein having a size sufficient for a user's head to pass therethrough.

6. The tray and bib system as recited in claim 1 where said rear wall defined by said bib means has a cut-out portion for arcuately interfacing with a neck of said user.

7. The tray and bib system as recited in claim 1 where said bib means includes a pair of strap members integrally formed in said rear wall and defining a perimeter portion of said cut-out for releasably coupling one to the other around said neck of said user.

8. The tray and bib system as recited in claim 6 where said cut-out portion is arcuate in contour.

9. The tray and bib system as recited in claim 1 where said flexibly collapsible housing is formed of a plastic material composition.

10. A disposable tray and bib system for the temporary support of food items, comprising:
    tray means for supporting said food items disposed thereon;
    means for releasably coupling said tray means to a user's body formed in one piece formation, said releasable coupling means includes (1) a container defined by a flexibly collapsible housing having a deformable cavity open on one end for receipt of said tray means, (2) a rear wall member having a first portion defining a wall of said cavity and a second portion extending longitudinally a predetermined distance external said deformable cavity, and (3) an opposing pair of side wall members extending angularly between a respective forward perimeter portion of said deformable cavity and said second portion of said rear wall member for supporting said tray means within said deformable cavity, said tray means including a container housing having a substantially parallelepiped contour and defining an internal housing chamber having a planar bottom member for supporting said food items, said container housing being matingly coupled to said flexibly collapsible housing within said deformable cavity, said container housing further including a plurality of corner members, each of said corner members extending a predetermined distance external said internal housing chamber for interfacing with said pair of opposing side walls to provide a vertically extending support for said opposing side walls in said vertical direction and maintaining said opposing side walls in a substantially vertical plane.

11. The disposable tray and bib system as recited in claim 10 where said rear wall member and said opposing pair of side wall members are integrally formed in one piece formation.

12. The disposable tray and bib system as recited in claim 11 where each of said opposing side wall members is integrally formed with a respective deformable cavity side wall in one piece formation.

13. The disposable tray and bib system as recited in claim 10 where said container is formed of a plastic material composition.

14. The disposable tray and bib system as recited in claim 10 where said rear wall member includes an opening formed therein for contiguously interfacing with a neck portion of said user, said rear wall member forming a bib member when in coupled relation with said user's body.

15. The disposable tray and bib system as recited in claim 14 where said container housing is formed of a cardboard material composition.

16. The disposable tray and bib system as recited in claim 14 where said container housing inserted within said cavity is adapted to be mounted on a lap portion of a user.

* * * * *